(12) United States Patent
Lin et al.

(10) Patent No.: US 11,524,437 B2
(45) Date of Patent: *Dec. 13, 2022

(54) MOLD STRUCTURE

(71) Applicant: RAYSPERT PRECISION INDUSTRIAL INC., Tainan (TW)

(72) Inventors: Shun-Fu Lin, Tainan (TW); Yu-Chang Su, Tainan (TW)

(73) Assignee: RAYSPERT PRECISION INDUSTRIAL INC., Tainan (TW)

( * ) Notice: Subject to any disclaimer, the term of this patent is extended or adjusted under 35 U.S.C. 154(b) by 32 days.

This patent is subject to a terminal disclaimer.

(21) Appl. No.: 17/199,393

(22) Filed: Mar. 11, 2021

(65) Prior Publication Data

US 2021/0308919 A1 Oct. 7, 2021

(30) Foreign Application Priority Data

Apr. 1, 2020 (TW) .................................. 109111276

(51) Int. Cl.
*B29C 45/34* (2006.01)
*B29C 45/76* (2006.01)
*B33Y 80/00* (2015.01)

(52) U.S. Cl.
CPC ............ *B29C 45/345* (2013.01); *B29C 45/76* (2013.01); *B33Y 80/00* (2014.12); *B29C 2945/76006* (2013.01); *B29C 2945/76257* (2013.01); *B29C 2945/76545* (2013.01)

(58) Field of Classification Search
CPC .................. B29C 45/345; B29C 45/76; B29C 2945/76006
See application file for complete search history.

(56) References Cited

U.S. PATENT DOCUMENTS

2019/0366607 A1* 12/2019 Lawless, III ........ B29C 45/1704

* cited by examiner

*Primary Examiner* — James Sanders
(74) *Attorney, Agent, or Firm* — Bruce Stone LLP; Joseph A. Bruce (57) ABSTRACT

Provided is an improved mold structure, including a first mold base, a second mold base and two controllers. The first mold base and the second mold base are operably aligned. When the first mold base and the second mold base are in an aligned state, a mold cavity is jointly framed. Two gas passages, a first mold core and a second mold core are provided. The first mold base is provided with a runner. Two ends thereof are respectively connected to a material tube and a mold cavity of a molding machine. The first and second mold cores are made of porous material. Vent pipelines thereof are connected to the respective gas passages. The two controllers are respectively connected to the gas passages, and control the gas in and out such that the pressure in different areas in the mold cavity reaches a predetermined value, thereby controlling the flow direction of the raw material in the mold cavity.

10 Claims, 10 Drawing Sheets

MOLD STRUCTURE

BACKGROUND OF THE INVENTION

1. Field of the Invention

The present disclosure relates to a mold structure, and more particularly to a structure that controls pressure values in different areas of a mold cavity according to the shape of the finished product and uneven thickness.

2. The Prior Arts

Generally, there are many reasons for poor molding of forming molds. The key to stable molding comes from the size and change of flow resistance of raw materials. That is, the smoothness of raw materials entering a molding die from a molding machine is related to the flow resistance of the raw materials. The factors that affect the flow resistance of raw materials include the following. For example, the material temperature is too low, the shooting speed is too slow, the mold temperature is too low, the exhaust is poor, or the flow length ratio is too long. If the material temperature is too low and the shooting speed is too slow, they can be improved by adjusting the molding machine data.

Figure 1:
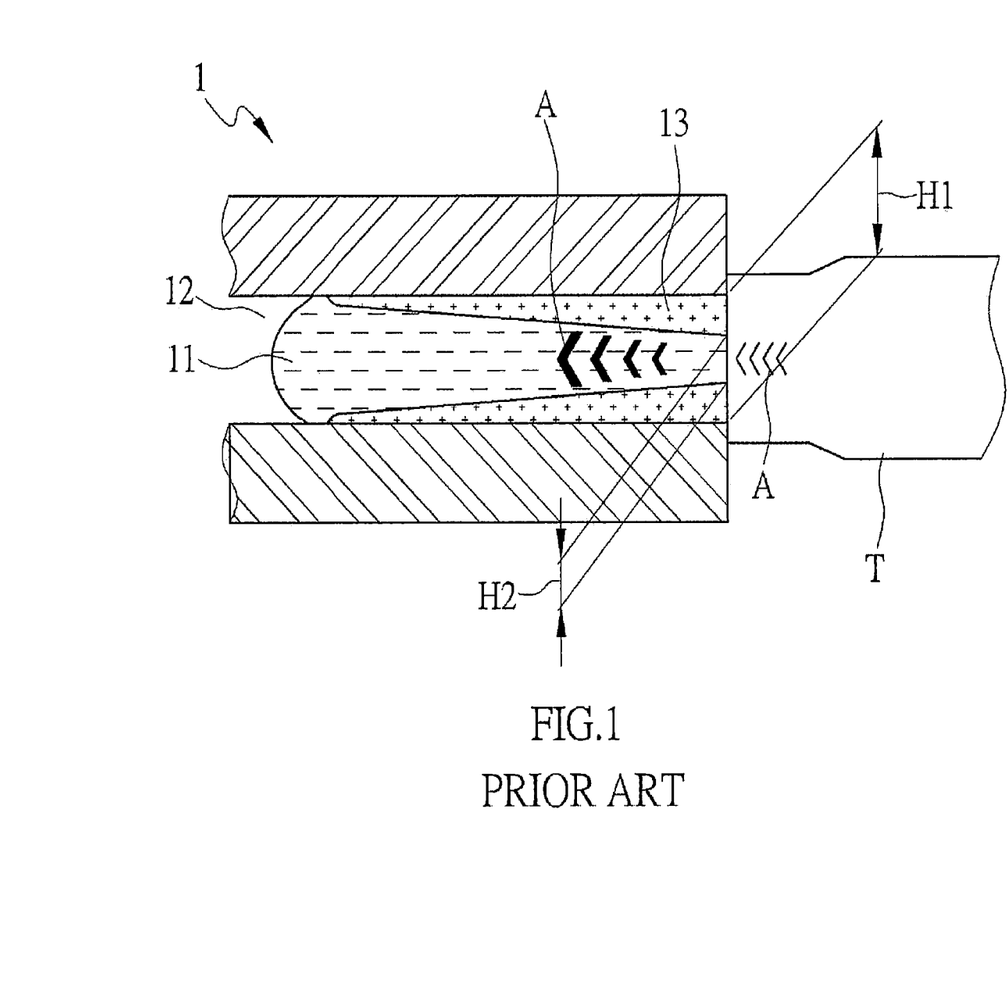
FIG. 1 is a schematic diagram of the prior art.

If the mold temperature is too low, it will cause the problem as shown in FIG. 1. Generally, the raw material 11 is melted at a high temperature in the material tube T by the molding machine, and then pushed into the mold 1 through the injection port of the material tube T. The arrow A indicates the feeding direction. In order to cool and solidify the raw material 11, the temperature of the wall surface of the mold cavity 12 is usually low than the temperature of the barrel. When the high-temperature raw material 11 enters the relatively low-temperature mold cavity 12 through the gate, a thin solidified layer 13 will become thicker and thicker with time. The space in which the raw material 11 can flow will become smaller and smaller. The original flow space H1 is gradually reduced due to the influence of the solidified layer 13. Therefore, the flow resistance of the raw material will be generated. Molds with a longer flow length ratio also have the above-mentioned situation. Most of the current solutions are to improve the temperature of the mold 1. However, such method consumes a lot of energy and affects the curing time of the raw material 11.

Figure 2:
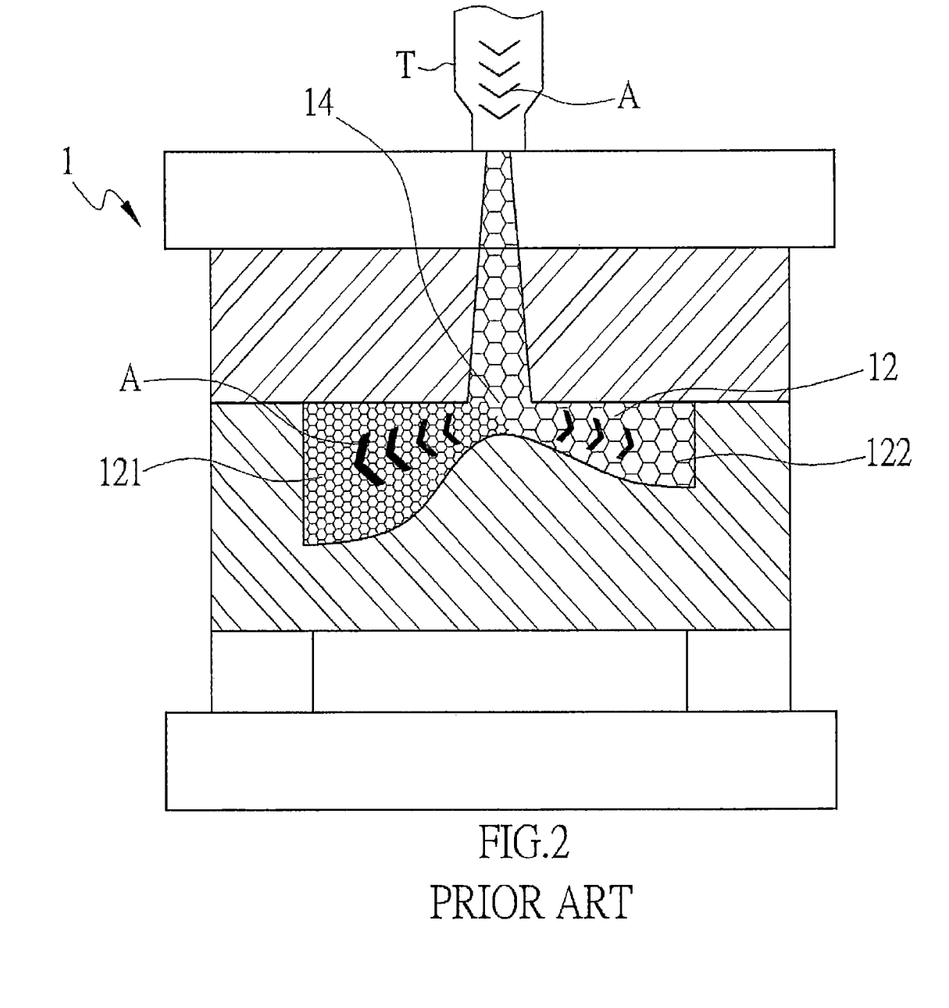
FIG. 2 is a schematic diagram of the prior art.

Further, as shown in FIG. 2, when the bottom wall of the mold cavity 12 is adjacent to the gate 14, the thickening of the solidified layer 13 during the molding process will hinder the gate 12, thereby causing the raw material to fail to get into the end of the mold cavity 12. Hence, the problem of incomplete filling occurs. In addition, when the pressure in the mold is equalized, and the shape of a finished product is irregular or the product itself has uneven thickness, after the raw material 11 is injected into the mold cavity 12, the pressure of the mold cavity 12 in the thinner part 122 of the finished product will generate resistance to the raw material 11. The raw material 11 is first filled into the mold cavity 12 corresponding to the thicker part 121 of the finished product. The arrow A indicates the feeding direction and flow direction. After the thicker part 121 is completely filled, the raw material 11 flows to the thinner part 122, resulting in a higher density of the finished product in the thicker part 121 and a lower density of the finished product in the thinner part 122 (FIG. 2 shows the density with a honeycomb distribution). As a result, the product will be deformed in the lower-density part. Additionally, when the flow length ratio is longer or the exhaust design is poor, the flow resistance of the raw material 11 to the end of the finished product is greater, and it is less easy to form. Although there is also an overflow groove in the mold to solve the above problems, the waste generated by the overflow groove ill also lead to an increase in material costs. Therefore, the prior technology is still not perfect.

SUMMARY OF THE INVENTION

In light of the shortcomings of the above-mentioned prior art, a main objective of the present disclosure is to solve the problem of poor molding caused by flow resistance of the current molding structure.

An improved mold structure of the present disclosure mainly includes a first mold base, a second mold base and two controllers. The first mold base and the second mold base are operably aligned. When the first mold base and the second mold base are in an aligned state, a mold cavity is jointly framed. In addition, the improved mold structure further includes a first gas passage, a second gas passage, a first mold core and a second mold core.

The first mold base is provided with a runner. One end of the runner is connected to a material tube. The other end thereof is connected to the mold cavity.

One side of the first mold core is a part of the mold cavity. A first vent pipeline is provided inside the first mold core, and includes at least one first main pipeline and a plurality of first auxiliary pipelines. The first main pipeline is connected to the first gas passage. Each of the first auxiliary pipelines is arranged at intervals. Both ends of each of the first auxiliary pipelines are respectively connected to the first main pipeline and the mold cavity. The first mold core is made of porous material, and the porous material makes the first mold core full of plural pores.

One side of the second mold core is a part of the mold cavity. A second vent pipeline is provided inside the second mold core, and includes at least one second main pipeline and a plurality of second auxiliary pipelines. The second main pipeline is connected to the second gas passage. Each of the second auxiliary pipelines is arranged at intervals. Both ends of each of the second auxiliary pipelines are respectively connected to the second main pipeline and the mold cavity. The second mold core is made of porous material, and the porous material makes the second core full of plural pores.

The two controllers are respectively connected to the first gas passage and the second gas passage, so as to control gas to enter the mold cavity from the first gas passage and the second gas passage through the first vent pipeline and the second vent pipeline, or to control the gas in the mold cavity to be discharged through the first gas passage and the second gas passage from the first vent pipeline and the second vent pipeline such that an area with the first mold core in the mold cavity and an area with the second mold core in the mold cavity respectively reach a predetermined pressure value. When a raw material of the material tube enters the mold cavity, the two controllers are used to synchronously adjust intake or exhaust to change the pressure value in the mold cavity, thereby controlling a flow direction of the raw material.

With the two controllers, the pressure values in the mold can be controlled in different areas, and the different pressure values can be used to control the flow directions of the raw material in the mold cavity such that the density of the product can be averaged, and the product defect rate and deformation after molding can be reduced.

DETAILED DESCRIPTION OF THE PREFERRED EMBODIMENT

The detailed description of the present invention is provided in combination with the accompanying drawings.

Please refer to FIG. 3-6. According to a preferred embodiment of the present disclosure, an improved mold structure is provided. The mold 2 mainly includes a first mold base 3, a second mold base 4 and two controllers 5. The first mold base 3 and the second mold base 4 are operably aligned. In the embodiment of the present disclosure, the second mold base 4 is provided with a mold cavity 44, and the first mold base 3 and the second mold base 4 jointly frame a mold cavity M in the aligned state, but not used to limit the structure of the mold cavity M. It is also possible to separately dispose a mold cavity in the first mold base 3 and the second mold base 4. When the first mold base 3 and the second mold base 4 are aligned, an aligned mold cavity is formed.

The side where the first mold base 3 and the second mold base 4 are aligned forms a first mold surface 32. The first mold base 3 is provided with a runner 33. One end of the runner 33 may be connected to the material tube of a molding machine, and the other end thereof is formed with a gate connected to the mold cavity M. In addition, a gasket groove 34 is provided on the first mold surface 32, and a gasket 35 is accommodated in the gasket groove 34. The gasket groove 34 is framed around the outer edge of the mold cavity M.

The second mold base 4 is provided with a second mold surface 41 which is aligned with the first mold surface 32. In the embodiment of the present disclosure, the mold cavity 44 is recessed from the second mold surface 41 toward the bottom of the second mold base 4. The second mold surface 41 is further provided with a first groove G1 and a second groove G2, which are arranged at intervals, and the distance between them can be determined according to the shape or thickness of the finished product. The drawings of the embodiment are illustrated by taking the thick and thin sections formed on both sides of the cross-section of the finished product as an example. Hereinafter, the area of the mold cavity M with the first mold core 6 is called the thick zone M1, and the area of the mold cavity M with the second mold core 7 is called the thin zone M2. The first groove G1 corresponds to the range of the thick zone M1 of the mold cavity M. The second groove G2 corresponds to the range of the thin zone M2 of the mold cavity M. The first mold core 6 is provided in the first groove G1, the second mold core 7 is provided in the second groove G2, and the second mold base 4 is further provided with a first gas passage 42 and a second gas passage 43.

One side of the first mold core 6 is a part of the mold cavity M. The first mold core 6 is provided with a first vent pipeline 61, and includes at least one first main pipeline 611 and a plurality of first auxiliary pipeline 612. The first main pipeline 611 is arranged along the periphery of the mold cavity M. The path shape of the first main pipeline 611 is changed with the contour of the mold cavity M (for example, linear, irregular, continuous curve, spiral, etc.). The first main pipeline 611 communicates with the first gas passage 42. Each of the first auxiliary pipelines 612 is arranged at intervals and along the contour of the mold cavity M. Both ends of each of the first auxiliary pipelines 612 are respectively connected to the first main pipeline 611 and the mold cavity M. The first mold core 6 is made of porous material, and the porous material makes the first mold core 6 full of plural pores. In the drawings of the present disclosure, the pores are represented by plural dots.

One side of the second mold core 7 is a part of the mold cavity M. A second vent pipeline is provided inside the second mold core 7, and includes at least one second main pipeline 711 and a plurality of second auxiliary pipelines 712. The second main pipeline 711 is arranged along the periphery of the mold cavity M. The path shape of the second main pipeline 711 is changed with the contour of the mold cavity M (for example, linear, irregular, continuous curve, spiral, etc.). The second main pipeline 711 communicates with the second gas passage 43. Each of the second auxiliary pipelines 412 is arranged at intervals and along the contour of the mold cavity M. Both ends of each of the second auxiliary pipelines are respectively connected to the second main pipeline 711 and the mold cavity M. The second mold core 7 is made of porous material, and the porous material makes the second mold core full of plural pores. The pores are represented by a plurality of dots in the drawings of the present disclosure. The first vent pipeline 61 and the second vent pipeline 71 are formed by three-dimensional (3D) printing or processed by air-permeable steel. The air-permeable steel is made by sintering countless steel spheres with the same or different diameters at high temperature such that all directions inside the air-permeable steel are evenly filled with tiny pores. Therefore, it is also called porous material or porous metal, which is suitable for linear path processing and shaping. In addition, it can also be filled with tiny pores in the three-dimensional printing additive manufacturing process. The drawings of the present disclosure do not show plural pores. Moreover, due to the stacking characteristics of 3D printing additive manufacturing, the complex path structure of the first vent pipeline 61 and the second vent pipeline 71 of the present disclosure that changes with the contour of the mold cavity M can be formed.

Figure 5:
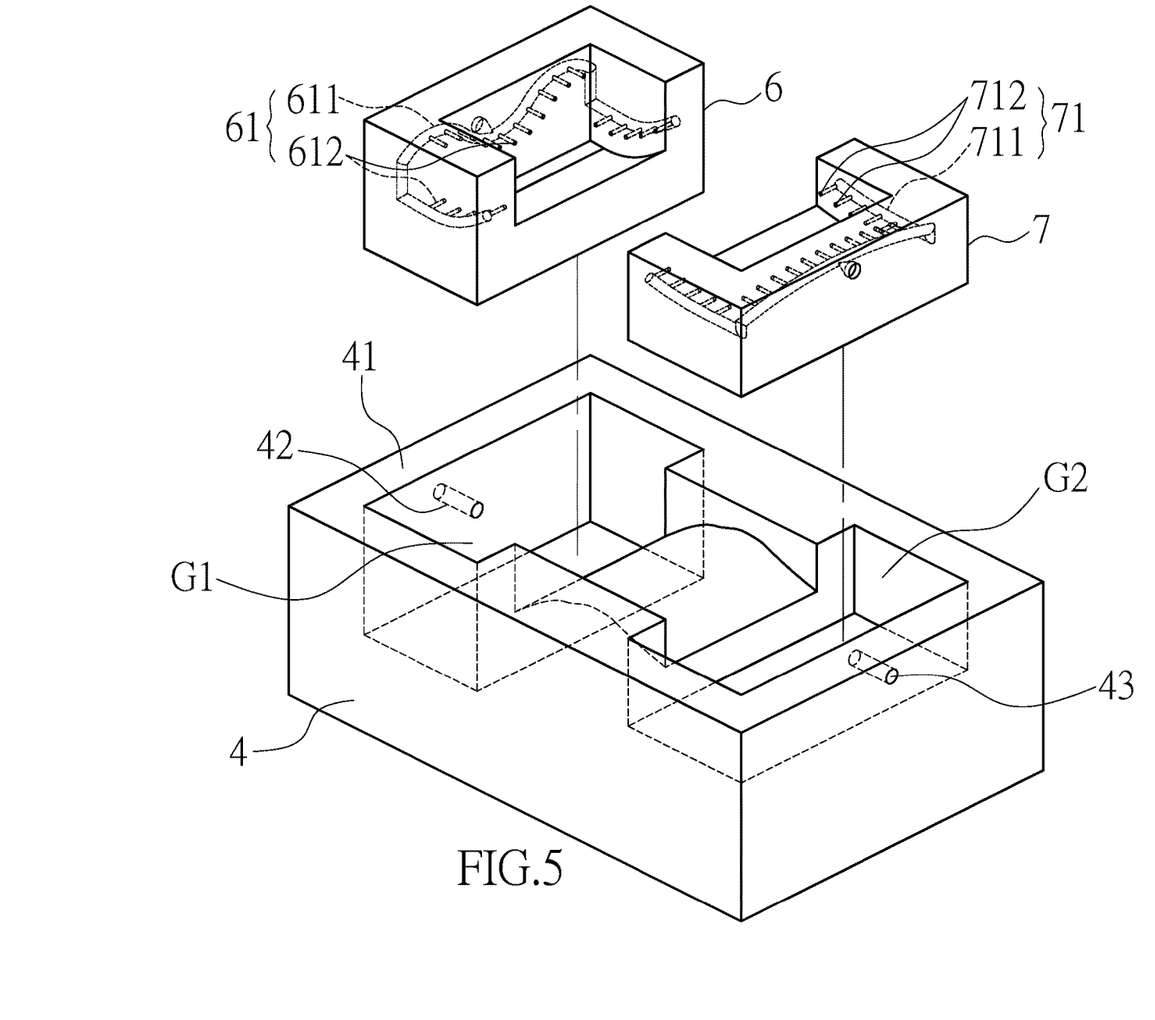
FIG. 5 is a three-dimensional exploded schematic diagram of the second mold base according to the present disclosure.
Figure 6:
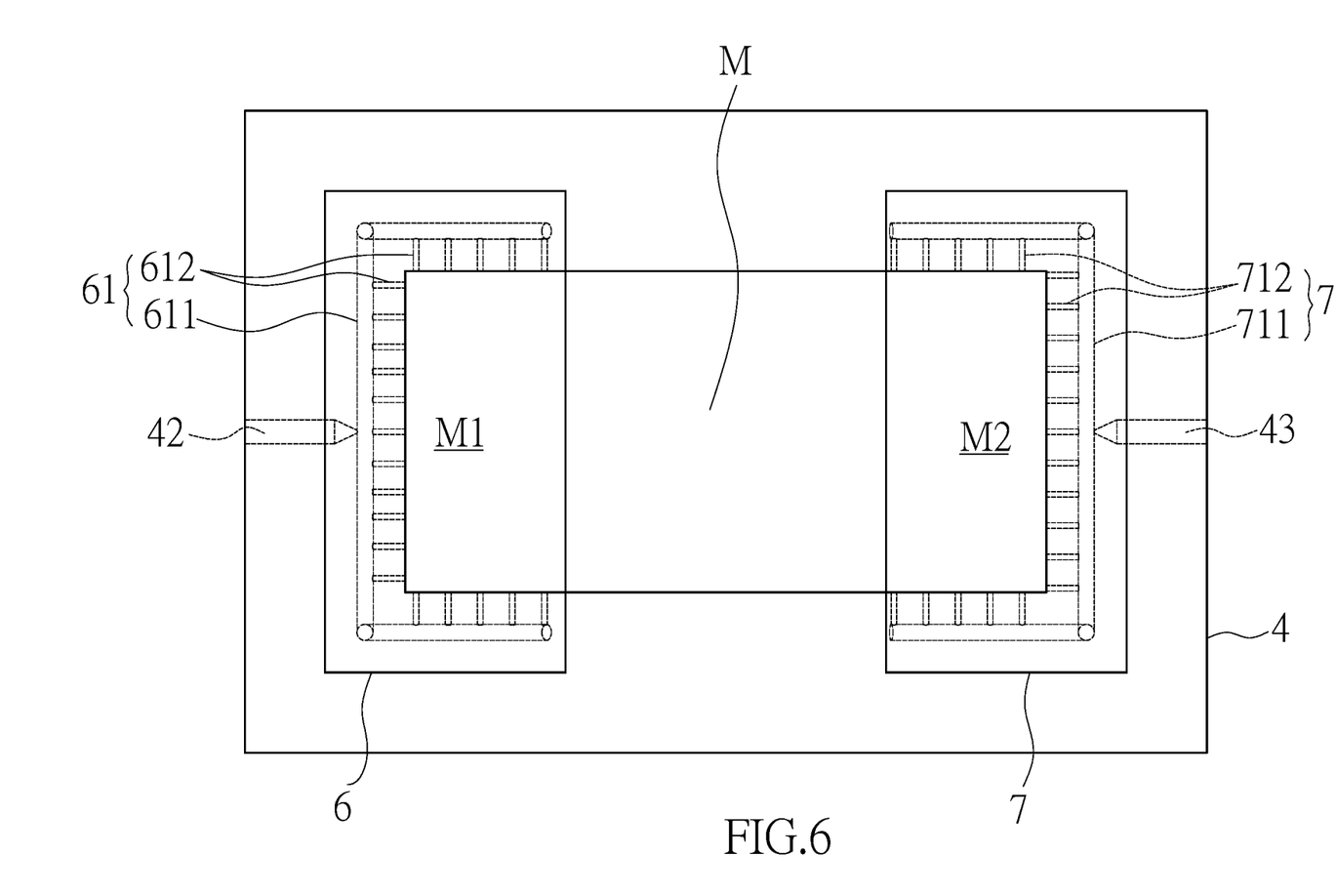
FIG. 6 is a top view of the second mold base according to the present disclosure.

Further, the present disclosure does not limit the shapes of the first main pipeline 611 and the second main pipeline 711. As shown in FIG. 5, the first vent pipeline 61 may be a non-circular main pipeline or a circular main pipeline. The structural designs and quantities of the first main pipeline 611 and the second main pipeline 711 and the quantity distributions of the first auxiliary pipeline 612 and the second auxiliary pipeline 712 mainly depend on the shape and size of the mold cavity M. The drawings of the present disclosure is only for illustration, but not limited to the present disclosure. Since FIGS. 5 and 6 mainly show the shapes of the first main pipeline 611 and the second main pipelines 711, the plural pores are not shown in the drawings.

The two controllers 5 are respectively connected to the first gas passage 42 and the second gas passage 43, so as to control gas to enter the mold cavity M from the first gas passage 42 and the second gas passage 43 through the first vent pipeline 61 and the second vent pipeline 71, or to control the gas in the mold cavity M to be discharged through the first gas passage 42 and the second gas passage 43 from the first vent pipeline 61 and the second vent pipeline 71 such that thick zone M1 and the thin zone M2 in the mold cavity reach the predetermined pressure values, respectively. The two controllers 5 can not only control the intake and exhaust volume of gas, but also control the sequence of gas intake and exhaust. When a raw material 11 of the material tube T enters the mold cavity M, the two controllers 5 are used to synchronously adjust intake or exhaust to change the pressure value in the mold cavity M, thereby controlling a flow direction of the raw material. The present disclosure does not limit the source of gas, which can be generated by a gas device (not shown). Through the complex path of 3D printing and the pressure value adjusted by each controller 5, products with different thickness and irregular shapes can be manufactured.

Figure 3:
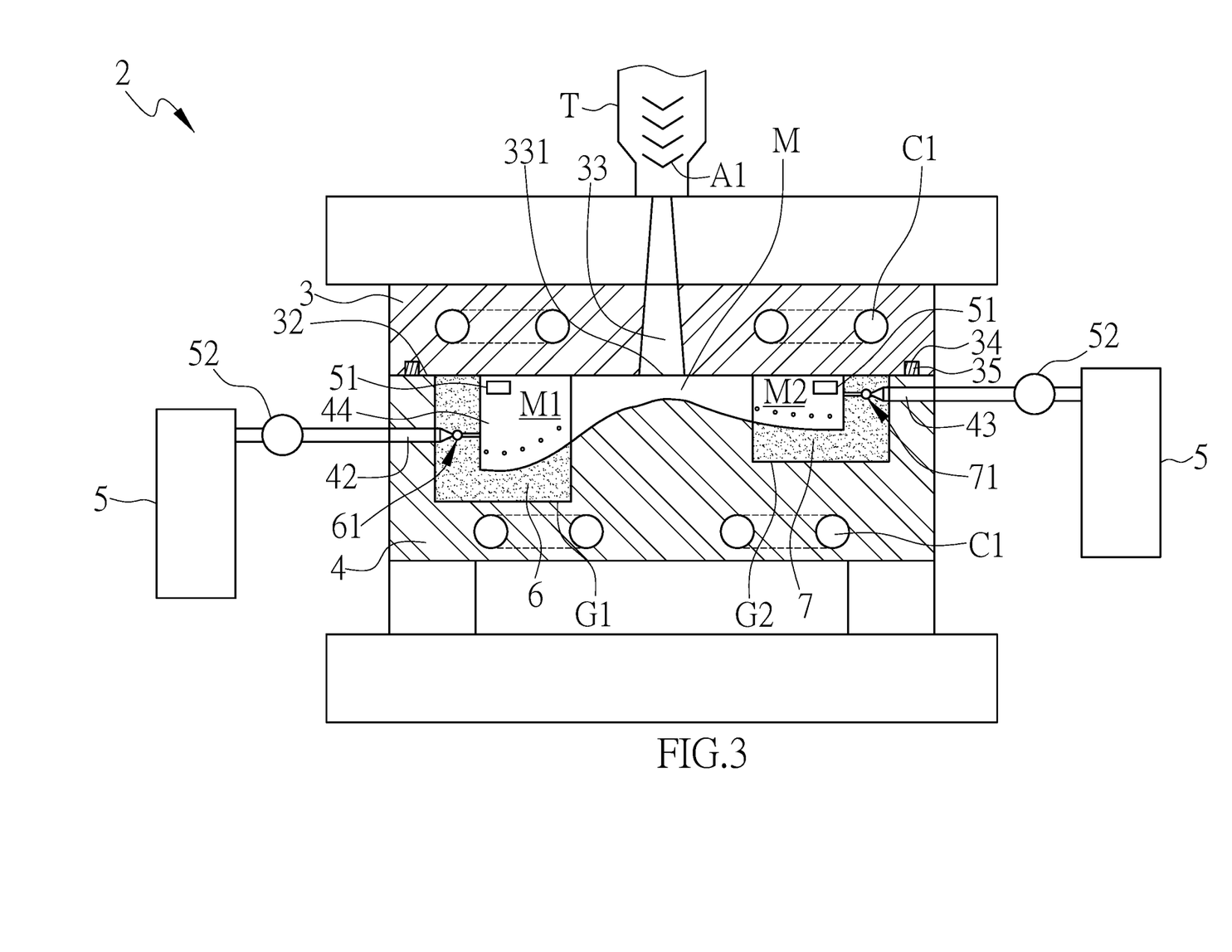
FIG. 3 is a schematic diagram of the present disclosure.
Figure 4:
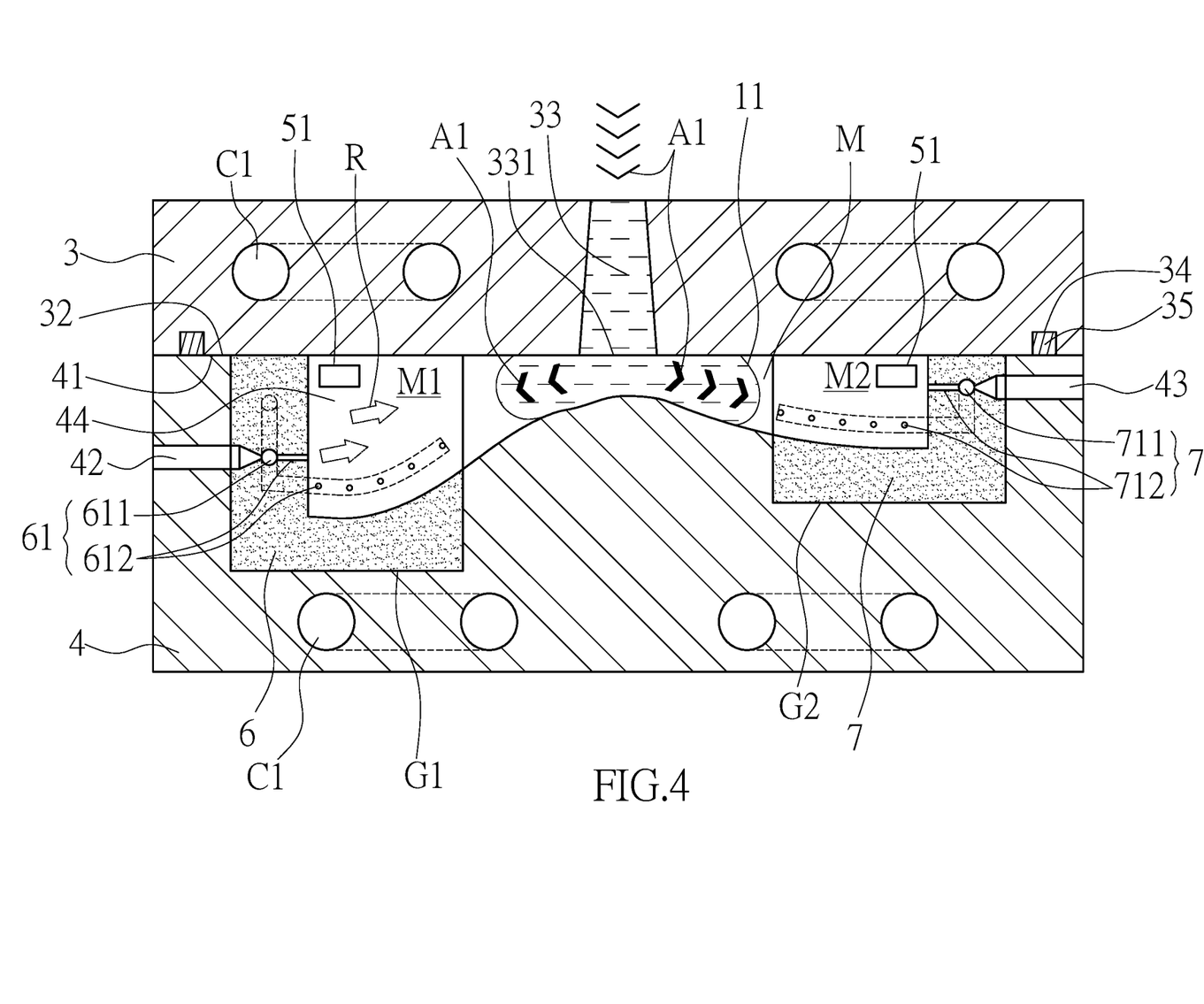
FIG. 4 is a schematic diagram of the pressure and the flow of raw materials according to the present disclosure.

In order to enable the two controllers 5 to obtain the pressure values of the thick zone M1 and the thin zone M2 in the mold cavity M more accurately, the present disclosure further includes two pressure sensing elements 51. The two pressure sensing elements 51 are electrically connected to the two controllers 5, respectively. The two pressure sensing elements 51 are arranged in the range of the thick zone M1 and the thin zone M2 of the mold cavity M to sense the pressure value thereof.

Additionally, the first mold base 3 and the second mold base 4 are respectively provided with a cooling channel C1. The cooling channel C1 can be circulated for coolant, such as water, refrigerant, etc., to reduce the temperature of the mold 2, shorten the solidification of the raw material 11 and enable the mold 2 to return to the predetermined temperature, thereby going to the next step. A check valve 52 is provided between the first gas passage 42 and one of the two controllers 5 and between the second gas passage 43 and the other of the two controllers 5. The check valve 52 is electrically connected to the controller 5. The check valve 52 mainly prevents gas in the mold cavity M from overflowing from the first gas passage 42 and the second gas passage 43, or prevents gas from entering from the first gas passage 42 and the second gas passage 43 such that the pressure value in the mold cavity M changes. Accordingly, this causes the problem of poor molding.

As such, when the first mold base 3 and the second mold base 4 are in the aligned state, the two sides of the gasket 35 are attached to the bottom of the gasket groove 34 and the second mold surface 41 so as to make the mold cavity M form a sealed state to prevent gas from leaking from the junction between the first mold surface 32 and the second mold surface 41. Depending on the characteristics of the raw materials 11, the two controllers 5 control the gas entering or existing so that the mold cavity M is in a back pressure or vacuum state. Alternatively, as shown in FIG. 4, according to the shape of the finished product and the degree of uneven thickness, the two controllers 5 are used to determine the pressure value of the thick zone M1 in the mold cavity M to be greater than the pressure value of the thin zone M2 in the mold cavity M, or the controller 5 of the thick zone M1 is used to adjust air intake, and the controller 5 of the thin zone M2 is used to adjust air exhaust so as to make the mold cavity M form states of inhalation and discharge and enable the raw material 11 to enter the mold cavity M from the runner 33 through the gate 331. As shown in the direction of arrow A1, the pressure generates resistance R to the raw material 11 such that the raw material 11 is filled into the thin zone M2 first. When the pressure filled into the thin zone M2 reaches the predetermined value, the controller 5 adjusts the pressure value of the thick zone M2 to change the flow direction of the raw material 11 to the thick zone M1, and evenly fill the entire mold cavity M. Therefore, the flow direction of the raw material 11 into the mold cavity M is controlled such that the density of the finished product can be averaged, and the yield of the finished product is improved, thereby reducing the deformation of the finished product and saving consumables and energy.

Figure 7:
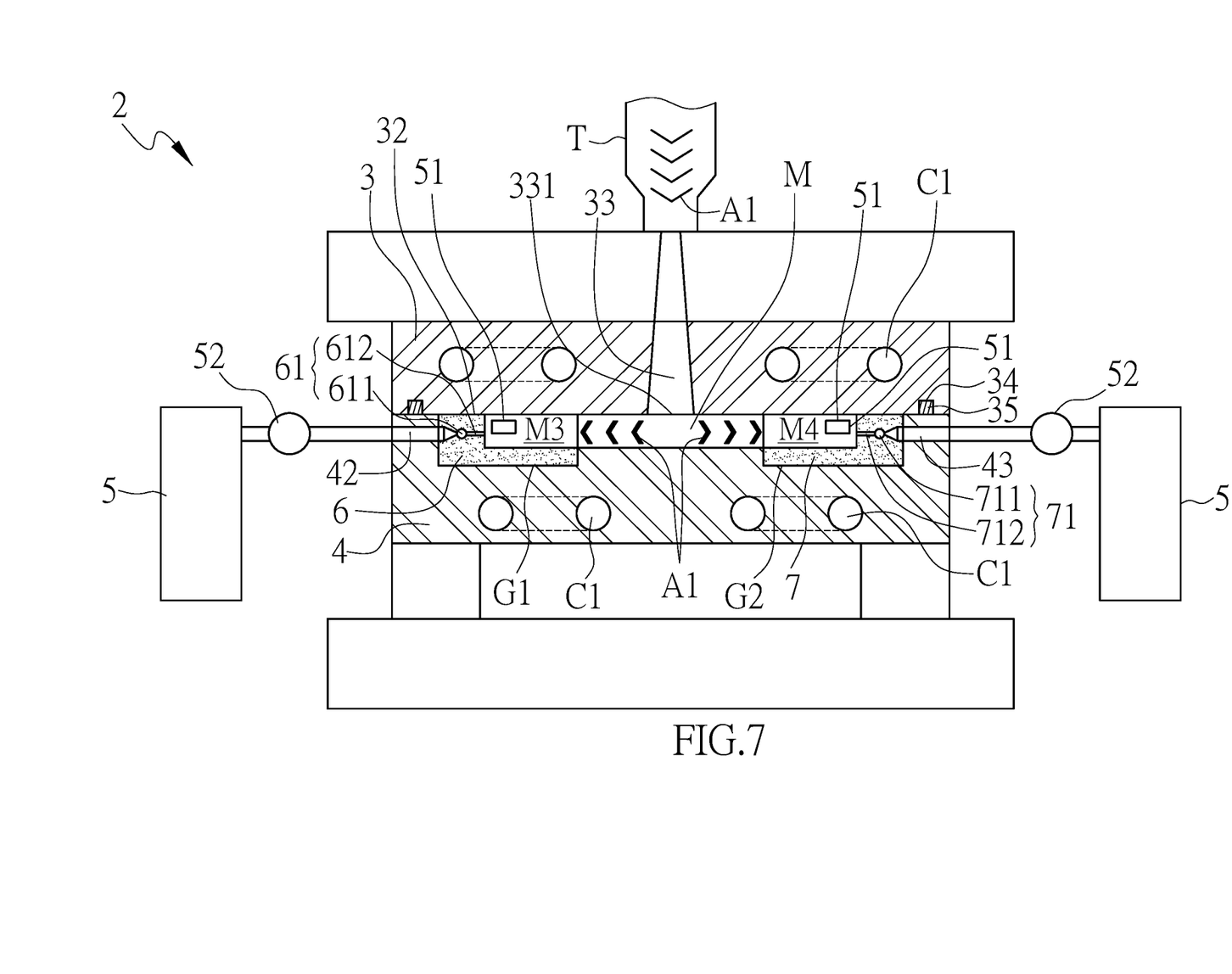
FIG. 7 shows a schematic diagram of a mold with a relatively long cavity flow length according to the present disclosure.

In addition to adjusting the pressure of the mold cavity M to a large pressure and a small pressure as described above, the pressure value of the mold cavity M can also be adjusted according to the shape of the mold cavity M, the flow length ratio and the different characteristics of the raw material 11. With reference to FIG. 7, FIG. 7 shows an embodiment where the mold cavity M is of equal height but the flow length is relatively long. Hereinafter, the area where the mold cavity M is provided with the first mold core 6 is called a first zone M3, and the area where the mold cavity M is provided with the second mold core 7 is called a second zone M4. In the embodiment of the present disclosure, the two controllers are used to determine the pressure values of the first zone M3 and the second zone M4 of the mold cavity M to be the same. After the raw material 11 enters the mold cavity M, since the gas in the first zone M3 and the second zone M4 of the mold cavity M is squeezed by the raw material, the gas is discharged by passing through the plural pores of the first mold core 6 and the second mold core 7. At the same time, the two controllers 5 control the gas in the first zone M3 of the mold cavity M to pass through the first auxiliary pipeline 612, the first main pipeline 611 and the first gas passage 42, thereby discharging the gas, and control the gas in the second zone M4 of the mold cavity M to pass through the second auxiliary pipeline 712, the second main pipeline 711 and the second gas passage 43, thereby discharging the gas. The above-mentioned exhausting procedure is mainly to release the pressure in the mold cavity M, and the raw material 11 is attracted to the end of the mold cavity M by the force generated when the gas is discharged. Accordingly, the mold cavity M can be completely filled by the raw material. As a result, the product will not have the phenomenon of incomplete filling at the end of the mold cavity M. This is commonly known as the entrapped air state. Therefore, the same method can be used for the raw material 11 with higher viscosity, so that the raw material 11 can be completely filled in the mold cavity M.

Moreover, after the raw material 11 enters the mold cavity M, the raw material 11 will not change due to different pressures (such as foaming). By means of the two controllers 5, the pressure value of the mold cavity M is adjusted to be the same as the pressure value of the material tube T of the molding machine such that the raw material 11 containing air can enters the mold cavity M, and is cured and formed into a lightweight finished product. The present disclosure can be applied to the molding of various raw materials, such as general plastics, foamed materials, biomass materials (environmental friendly materials), TPR, TPU, liquid silicone . . . , etc. According to the characteristics of various raw materials, the present disclosure can adjust the gas intake and exhaust volume such that the pressure value of the mold cavity M meets the molding conditions, and the pressure value can be adjusted and changed immediately to change the flow direction and flow rate of the raw material 11.

Figure 8:
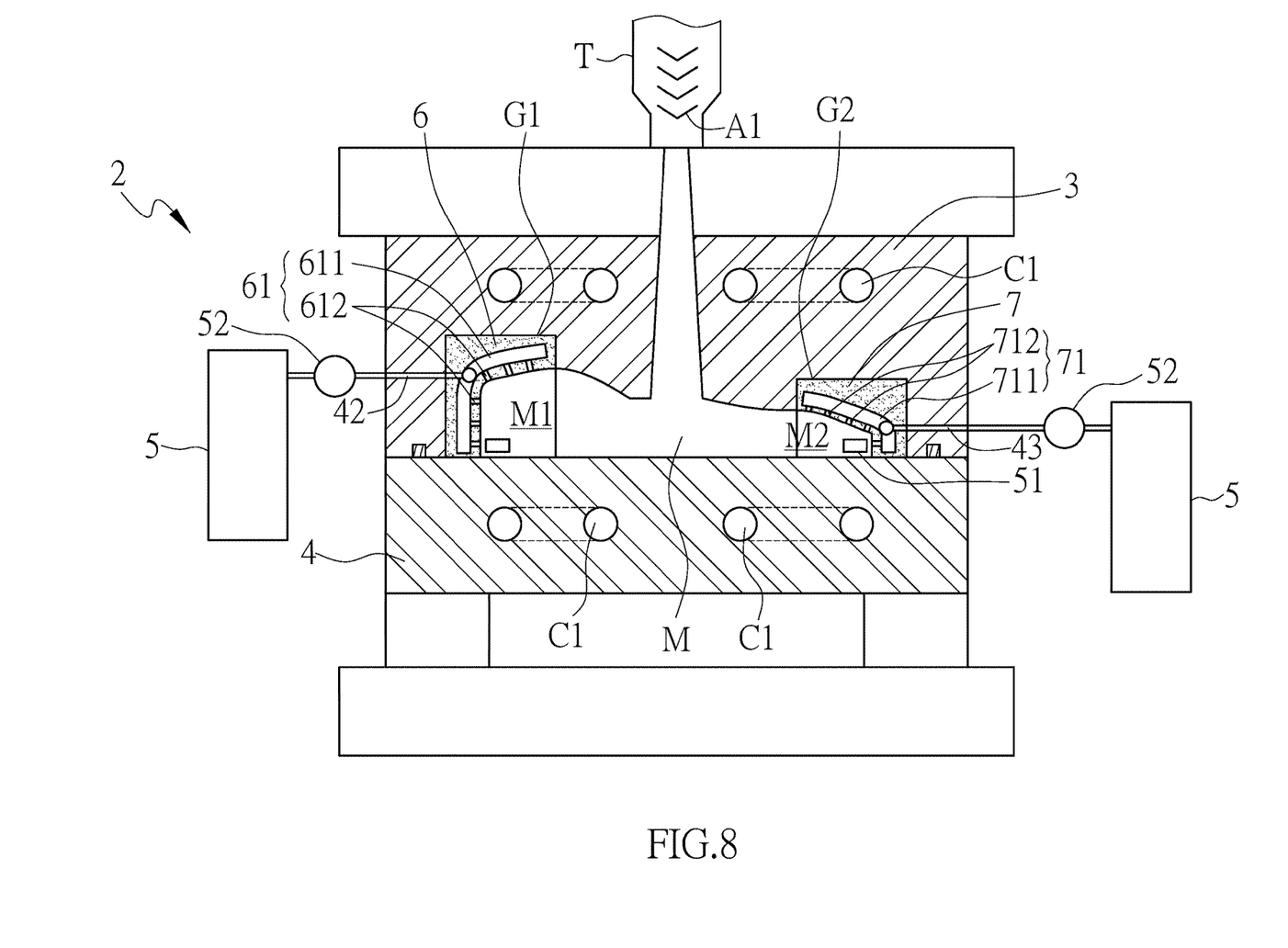
FIG. 8 is a schematic diagram of the first embodiment of the present disclosure.

Please continue to refer to FIG. 8, which shows the first embodiment of the present disclosure. It can be clearly seen from FIG. 8 that this embodiment is a modified embodiment of the aforesaid embodiment. Accordingly, the same structure will not be described in detail, and only the differences will be described below. In this embodiment, the first groove G1, the second groove G2, the first gas passage 42 and the second gas passage 43 are arranged on the first mold base 3. The first groove G1 corresponds to the range of the thick zone M1, and the second groove G2 corresponds to the range of the thin zone M2. The first mold core 6 is provided in the first groove G1, and the second mold core 7 is arranged in the second groove G2. The first mold core 6 is provided with a first vent pipeline 61 connected to the first gas passage 42, and the second mold core 7 is provided with a second vent pipeline 71 connected to the second gas passage 43. Two controllers are respectively connected to the first gas passage 42 and the second gas passage 43. In addition, the two controllers 5 control the air intake and exhaust operation modes of the gas in the mold cavity M based on the above. Therefore, it will not be repeated herein.

Figure 9:
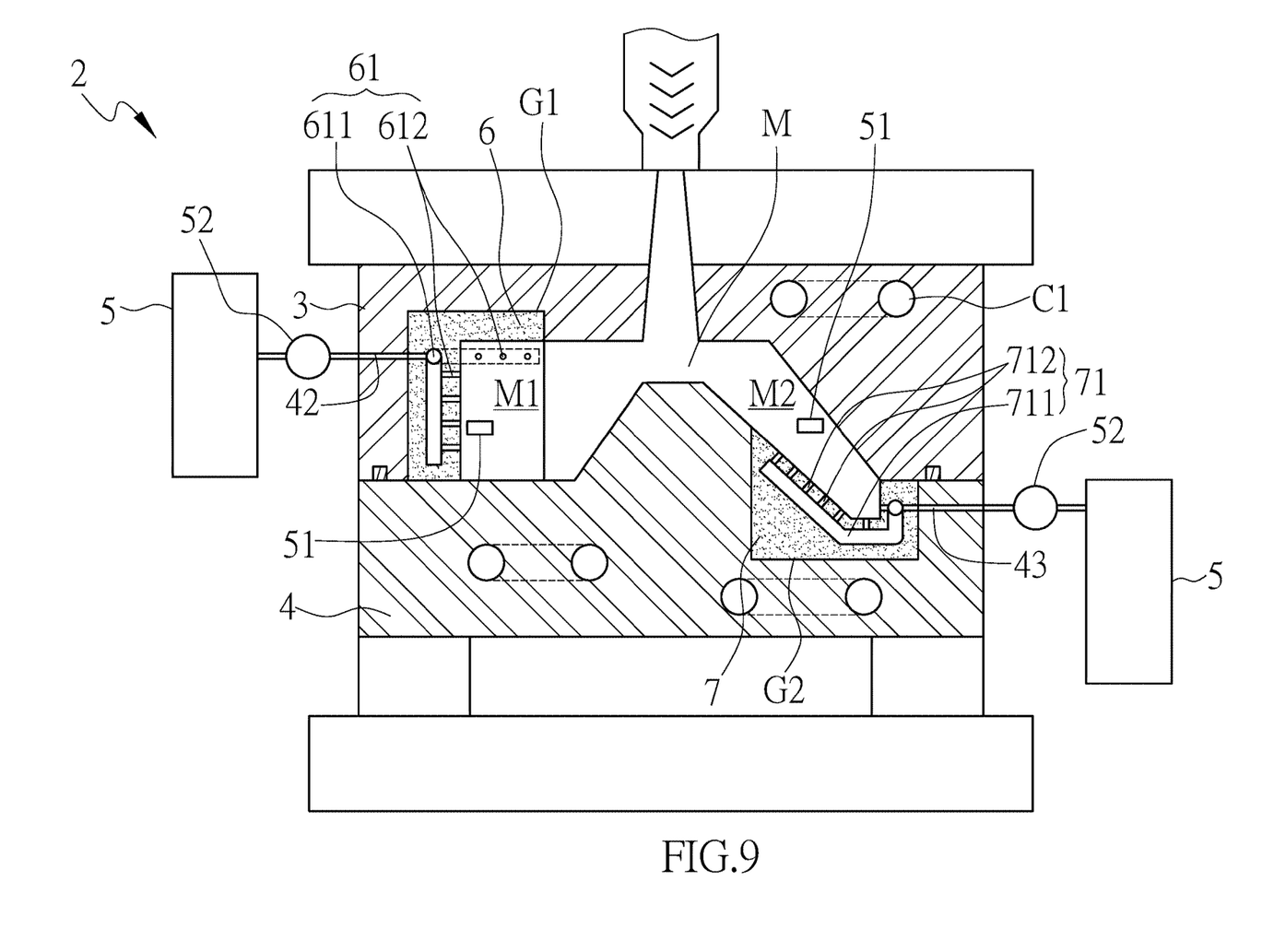
FIG. 9 is a schematic diagram of the second embodiment of the present disclosure.

With reference to FIG. 9, FIG. 9 shows the second embodiment of the present disclosure. It can be clearly seen from FIG. 9 that this embodiment is a modification of the above-mentioned embodiment. Hence, the same structure will not be described in detail, and only the differences will be described below. In this embodiment, the first groove G1 and the first gas passage 42 are provided on the first mold base 3. The second groove G2 and the second gas passage 42 are arranged on the second mold base 4. The first groove G1 corresponds to the range of the thick zone M1, and the second groove G2 corresponds to the range of the thin zone M2 to form a staggered arrangement. The first mold core 6 is provided in the first groove G1, and the second mold core 7 is disposed in the second groove G2. The first mold core 6 is provided with a first vent pipeline 61 connected to the first gas passage 42, and the second mold core 7 is provided with a second vent pipeline 71 connected to the second gas passage 43. Two controllers 5 are respectively connected to the first gas passage 42 and the second gas passage 43. Moreover, the two controllers 5 control the air intake and exhaust operation modes of the gas in the mold cavity M based on the above. Consequently, it will not be repeated herein.

Figure 10:
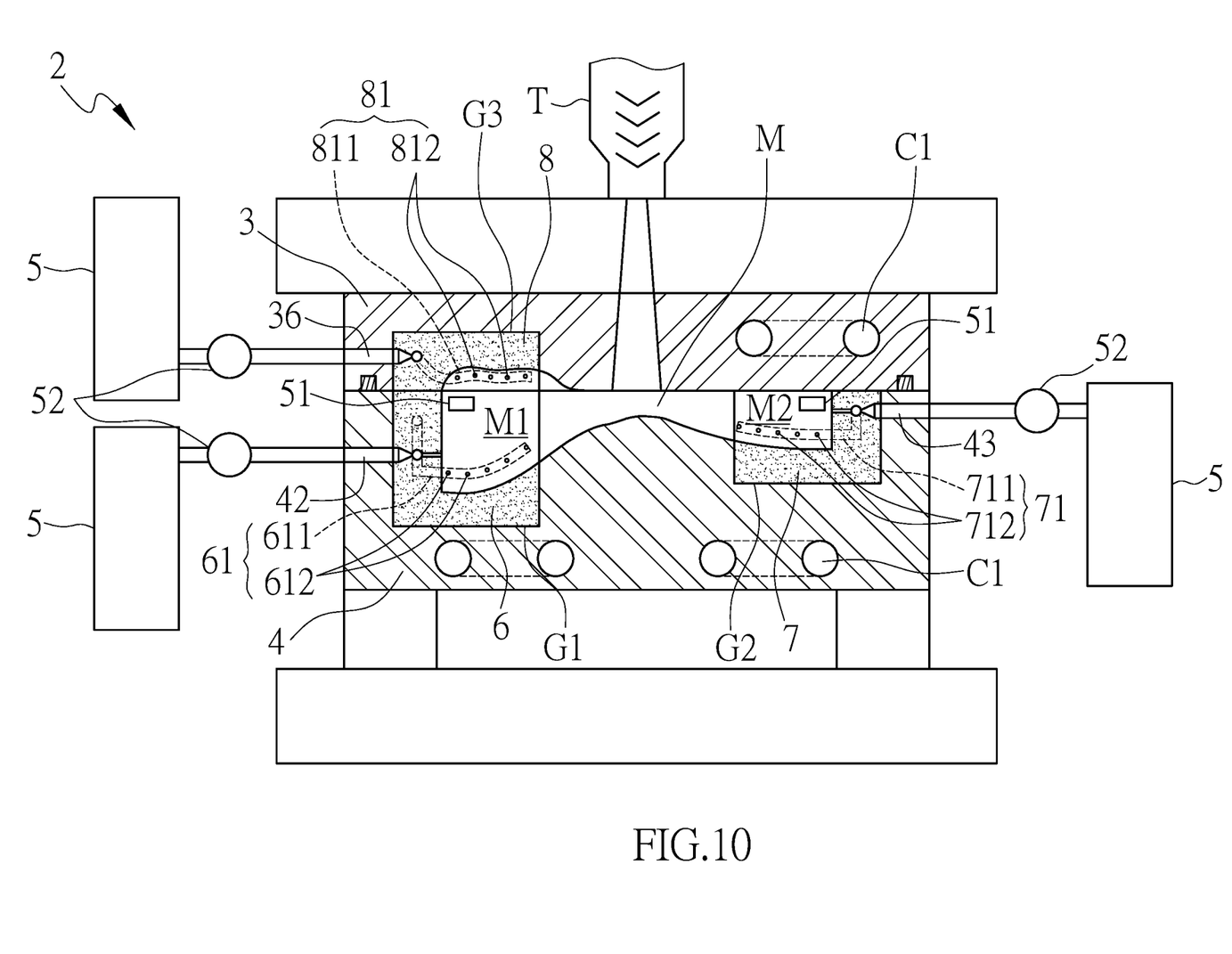
FIG. 10 is a schematic diagram of the third embodiment of the present disclosure.

Please continue to refer to FIG. 10, which shows the third embodiment of the present disclosure. It can be clearly seen from FIG. 10 that this embodiment is a variation of the above-mentioned embodiment. Therefore, the same structure will not be described in detail, and only the differences will be described hereinafter. In this embodiment, the second mold base 4 is provided with the first groove G1, the second groove G2, the first gas passage 42 and the second gas passage 43. The first mold core 6 is provided in the first groove G1, and the second mold core 7 is provided in the second groove G2. The first mold base 3 is further provided with a third groove G3 and a third gas passage 36, and a third mold core 8 is further provided in third groove G3. One side of third mold core 8 is a part of the mold cavity M, and a third vent pipeline 81 is provided inside the third mold core 8, and includes at least one third main pipeline 811 and a plurality of third auxiliary pipelines 812. The third main pipeline 811 is connected to the third gas passage 36. The third auxiliary pipelines 812 are arranged at intervals, and both ends of each of the third auxiliary pipelines 812 are respectively connected to the third main pipeline 811 and the mold cavity M. The third mold core 8 is made of porous material, and the porous material makes the second mold core 8 full of multiple pores. The pores are represented by a plurality of dots in the drawings of the present disclosure. A controller 5 is connected to the third gas passage 36 so as to control gas in the mold cavity M to be discharged through the third vent pipeline 81 and the third gas passage 36, or to control gas to enter the mold cavity M through the third gas passage 36 and third vent pipeline 81. Accordingly, the pressure value in the area of the third mold core 8 can be adjusted. The present disclosure does not limit the number of mold cores and controllers, which can be determined according to the shape of a finished product and the degree of uneven thickness. However, it is necessary to have one mold core with a controller such that the pressure value in the mold cavity M can be optimally controlled, and then a finished product with high yield can be obtained.

It is worth mentioning that in addition to controlling the pressure value of the mold cavity M by the first vent pipeline 61 and the second vent pipeline 71 of the present disclosure, after a finished product in the mold cavity M is formed as well as the first mold base 3 and the second mold base 4 are separated, the two controllers 5 can be used to discharge gas through the first gas passage 42, the second gas passage 43, the first vent pipeline 61 and the second vent pipeline 71. As such, a finished product is sprayed away from the mold cavity M without using a thimble or other removal equipment. As a result, the finished product can be automatically demolded.

In summary, the present disclosure is able to determine pressure values for different areas in the mold cavity M, and allows the two controllers 5 to adjust the pressure values of different areas to be the same or different. In addition, in the present disclosure, the pressure of the mold cavity M can be adjusted to the same as the pressure of the material tube T of the molding machine, and the pressure adjustment is made according to the characteristics of the raw materials 11 such that the present disclosure is different from the prior art, and a finished product with high yield is obtained.

Although the present disclosure has been described with reference to the preferred exemplary embodiments thereof, it is apparent to those skilled in the art that a variety of modifications and changes may be made without departing from the scope of the present disclosure which is intended to be defined by the appended claims.

What is claimed is:

1. An improved mold structure, comprising:
a first mold base, a second mold base and two controllers, the first mold base and the second mold base are operably aligned, when the first mold base and the second mold base are in an aligned state, a mold cavity is jointly framed, and the improved mold structure further comprises a first gas passage, a second gas passage, a first mold core and a second mold core;
the first mold base is provided with a runner, one end of the runner is connected to a material tube, and the other end thereof is connected to the mold cavity;
one side of the first mold core is a part of the mold cavity, a first vent pipeline is provided inside the first mold core, and comprises at least one first main pipeline and a plurality of first auxiliary pipelines, the first main pipeline is connected to the first gas passage, each of the first auxiliary pipelines is arranged at intervals, both ends of each of the first auxiliary pipelines are respectively connected to the first main pipeline and the mold cavity, the first mold core is made of porous material, and the porous material makes the first mold core full of plural pores;

one side of the second mold core is a part of the mold cavity, a second vent pipeline is provided inside the second mold core, and comprises at least one second main pipeline and a plurality of second auxiliary pipelines, the second main pipeline is connected to the second gas passage, each of the second auxiliary pipelines is arranged at intervals, both ends of each of the second auxiliary pipelines are respectively connected to the second main pipeline and the mold cavity, the second mold core is made of porous material, and the porous material makes the second mold core full of plural pores; and the two controllers are respectively connected to the first gas passage and the second gas passage, so as to control gas to enter the mold cavity from the first gas passage and the second gas passage through the first vent pipeline and the second vent pipeline, or to control the gas in the mold cavity to be discharged through the first gas passage and the second gas passage from the first vent pipeline and the second vent pipeline such that an area with the first mold core in the mold cavity and an area with the second mold core in the mold cavity respectively reach a predetermined pressure value, and when a raw material of the material tube enters the mold cavity, the two controllers are used to synchronously adjust intake or exhaust to change the pressure value in the mold cavity, thereby controlling a flow direction of the raw material.

2. The improved mold structure of claim 1, wherein the first mold base or the second mold base is provided with a first groove and a second groove, the first mold core and the second mold core are respectively arranged in the first groove and the second groove, and the first gas passage and the second gas passage are arranged on the first mold base or the second mold base.

3. The improved mold structure of claim 1, wherein the first mold based is provided with a first groove, the second mold base is provided with a second groove, the first groove is misaligned with the second groove, the first mold core and the second mold core are respectively arranged in the first groove and the second groove, and the first gas passage and the second gas passage are respectively arranged on the first mold base and the second mold base.

4. The improved mold structure of claim 1, wherein the pressure values controlled by the two controllers are the same or different.

5. The improved mold structure of claim 1, wherein and end surface of the first mold base opposite to the second mold base is provided with a gasket groove and a gasket, the gasket is arranged in the gasket groove, and a gasket groove frame surrounds an outer edge of the mold cavity.

6. The improved mold structure of claim 1, wherein the first main pipeline and the second main pipeline are in one of a loop shape and a non-circular shape.

7. The improved mold structure of claim 1, wherein the first main pipeline and the second main pipeline are arranged along a periphery of the mold cavity, and path shapes of the first main pipeline and the second main pipeline are changed according to a contour of the mold cavity.

8. The improved mold structure of claim 1, further comprising two pressure-sensitive elements arranged in the mold cavity at intervals to sense the pressure values of the area where the first core is provided and the area where the second mold core is provided in the mold cavity.

9. The improved mold structure of claim 1, wherein a third mold core and a third gas passage are further provided in the mold structure, one side of the third mold core is a part of the mold cavity, a third vent pipeline is provided inside the third mold core, and comprises at least one third main pipeline and a plurality of third auxiliary pipelines, the third main pipeline is connected to the first gas passage, each of the third auxiliary pipelines is arranged at intervals, both ends of each of the third auxiliary pipelines are respectively connected to the third main pipeline and the mold cavity, the third mold core is made of porous material, the porous material makes the third mold core full of plural pores, and a controller is further connected to the third gas passage.

10. The improved mold structure of claim 1, wherein the first mold core and the second mold core are formed by three-dimensional printing.

* * * * *